United States Patent
Pradel et al.

(10) Patent No.: US 8,551,334 B2
(45) Date of Patent: Oct. 8, 2013

(54) FILTER CAPSULE

(75) Inventors: Guenter Pradel, Goettingen (DE); Maik Roehl, Hoexter (DE)

(73) Assignee: Sartorius Stedim Biotech GmbH (DE)

( * ) Notice: Subject to any disclaimer, the term of this patent is extended or adjusted under 35 U.S.C. 154(b) by 125 days.

(21) Appl. No.: 12/759,885

(22) Filed: Apr. 14, 2010

(65) Prior Publication Data

US 2010/0282665 A1 Nov. 11, 2010

(30) Foreign Application Priority Data

May 9, 2009 (DE) .......................... 10 2009 020 683

(51) Int. Cl.
 *B01D 35/00* (2006.01)
 *B01D 35/28* (2006.01)
 *B01D 35/30* (2006.01)
(52) U.S. Cl.
 USPC ............ 210/248; 210/120; 210/436; 210/472
(58) Field of Classification Search
 USPC ................... 210/120, 248, 436, 472
 See application file for complete search history.

(56) References Cited

U.S. PATENT DOCUMENTS

| | | | |
|---|---|---|---|
| 627,675 A * | 6/1899 | Zwietusch | 210/344 |
| 2,554,016 A * | 5/1951 | Czarnecki, Jr. et al. | 210/436 |
| 4,045,345 A | 8/1977 | Drori | |
| 5,468,388 A | 11/1995 | Gooddard et al. | |
| 7,419,591 B2 * | 9/2008 | Aberle et al. | 210/170.03 |
| 2001/0000893 A1* | 5/2001 | Hopkins et al. | 210/348 |
| 2007/0187306 A1* | 8/2007 | Pecca | 210/120 |

FOREIGN PATENT DOCUMENTS

| | | |
|---|---|---|
| DE | 29814103 U1 | 12/1998 |
| DE | 200 08 112 | 10/2001 |
| JP | 2003-210912 | 7/2003 |

* cited by examiner

*Primary Examiner* — Benjamin Kurtz
(74) *Attorney, Agent, or Firm* — Gerald E. Hespos; Michael J. Porco; Matthew T. Hespos

(57) ABSTRACT

A filter capsule has a filter housing which, on at least one end face, has an end cap with an air release valve. A protective wall is formed on the end cap at a distance from the air release valve and protrudes beyond the air release valve.

16 Claims, 4 Drawing Sheets

FILTER CAPSULE

BACKGROUND OF THE INVENTION

1. Field of the Invention

The invention relates to a filter capsule with a filter housing which, on at least one end face, has an end cap with an air release valve.

2. Description of the Related Art

Plastic filter capsules suitable for disposal after one use are employed increasingly in biotechnology. More particularly, increasing use is being made of filter capsules with the inflow and outflow configured in a T-style design. Thus, the housing inlet and outlet are arranged on one end, or on one end cap, of the filter capsule. The housing inlet and the housing outlet, in this case, are designed in a T-shape so that they each are arranged transverse to the longitudinal axis of the filter housing and are connected at an angle to the non-filtrate chamber and filtrate chamber, respectively.

An air release valve is required to avoid a gas volume developing at the upper end of the non-filtrate chamber if the two connection pieces are arranged in the vertical direction on the upper end cap of the filter capsule. A corresponding air release valve is required on that end cap opposite the end cap with the connection pieces if the filter capsule is used so that the end cap carrying the connection pieces is at the bottom in the vertical direction.

Air release valves that are at the highest point disadvantageously protrude beyond the wall of the filter capsule or end cap in the direction of the longitudinal axis or occasionally transverse to the longitudinal axis. These air release valves, particularly those of plastic filter capsules, are susceptible to breaking off if used improperly. Filter capsules may be welded into a film to achieve a sterile state. However, the packaging film may be damaged by the air release valve and incorrect storage. As a result, the filter capsule may become contaminated.

JP 2003210912 A discloses a filter capsule that has a cylindrical filter housing with upper and lower end faces closed respectively by upper and lower end caps. The upper end cap has an air release nozzle connected to a non-filtrate chamber arranged between a filter and the housing wall. The lower end cap is opposite the upper end cap and has a housing inlet and a housing outlet arranged transverse to the longitudinal axis of the housing. The housing inlet and outlet form a T-shape to define a T-style design. The housing inlet is connected to the non-filtrate chamber, and the housing outlet is connected to the filtrate chamber. The lower end cap likewise has an air release nozzle connected to the non-filtrate chamber. Depending on the installation position, the lower air release nozzle in each case is closed, and the air release nozzle arranged at the top in the vertical direction is used. Air release valves, not shown, can be attached to the air release nozzles.

The air release nozzles or air release valves connected to the air release nozzles of the known filter capsule disadvantageously protrude beyond the end caps in the longitudinal direction and can break off if used improperly. It is also possible that any outer packaging will be damaged by the air release nozzles or by the valves thereof.

Accordingly, an object of the invention is to provide a filter capsule with air release valves that are not susceptible to breaking off the end caps, even in the event of improper use, and that cannot adversely damage any outer packaging.

SUMMARY OF THE INVENTION

The invention relates to a filter capsule with an end cap and a protective wall formed on the end cap at a distance from the air release valve. The protective wall protrudes beyond the air release valve on a side directed toward the protective wall.

The protective wall preferably is approximately parallel to the air release valve and is wider and higher than the valve. Thus, the protective wall protrudes beyond the air release valve laterally and vertically to provide better protection against unanticipated forces. A suitably configured protective wall can avoid a puncturing overload that could damage the outer packaging. The fact that the protective wall is at a distance from the air release valve ensures easy handling, such as manual opening or closing of the air release valve.

The longitudinal axes of the air release valve and the protective wall are arranged approximately parallel to the longitudinal axis of the filter housing. The protective wall preferably defines a protective tongue directed away from the end cap. The protective tongue has a width that is greater than the greatest external diameter of the air release valve, and the free end of the protective tongue protrudes beyond the free end of the air release valve. The protective tongue preferably is flat and parallel to the longitudinal axis of the air release valve. However, the end of the protective tongue spaced from the end cap also can be at a greater distance from the air release valve than the base end of the protective tongue that is connected to the end cap. The protective wall may be curved or arranged in a semicircle or segment of a semicircle around the air release valve. The important point is that sufficient room remains for manually adjusting the air release valve.

The protective tongue may have a stabilizing rib toward its base end or toward the end cap. The stabilizing rib stabilizes the protective tongue and avoids breakage of the protective tongue in response to improper use.

The longitudinal axes of the air release valve and the protective wall preferably are approximately transverse to the longitudinal axis of the filter housing. The protective wall can be a protective tongue if the air release valve is transverse to the longitudinal axis. Such a design then has the same advantages as those set out above.

The protective wall may form the bottom of a radially arranged recess of the end face of the end cap. The recess opens toward the circumference of the end cap and is delimited by two mutually opposite side surfaces and by a base surface that connects the side surfaces. The base surface is set back so far from the circumference of the filter housing that the air release valve arranged on the base surface does not protrude beyond the circumference of the filter capsule or of the end cap. The depth of the recess, or the height of the base surface, is such that the air release valve, with its greatest diameter, does not protrude beyond the end face of the end cap and is at such a distance from the protective wall, or the bottom of the recess, that a manual operation of the air release valve is possible.

The arrangement of the air release valve in the recess of the end cap has the advantage that the air release valve is protected practically on all sides. The side surfaces and the base surfaces of the recess are substantially perpendicular to the protective wall or to the bottom of the recess. The mutually opposite side surfaces of the recess can also be oblique in relation to the bottom, i.e. have a greater spacing toward the end face of the end cap. The end face of the end cap at the same time forms a kind of second protective wall, so that the air release valve is embedded between two protective walls. Here too, it is important that the side walls are at such a distance from the air release valve that the air release valve is easy to operate manually.

According to another preferred embodiment of the invention, a housing inlet and a housing outlet are arranged transverse to the longitudinal axis of the filter housing on a first end cap. The housing inlet is connected to a non-filtrate chamber arranged upstream of a filter in the filter housing. The housing outlet is connected to a filtrate chamber arranged downstream of the filter in the filter housing. The housing inlet and the housing outlet thus are arranged at one end of the filter capsule and form a T-shaped connector in the T style. The T-shaped configuration of the connection has advantages, particularly when several filter capsules are interconnected. Such a filter can additionally optionally be installed so that the housing inlet and the housing outlet are arranged on the upper end cap or on the lower end cap. The air release valve lying at the top in each case then forms the actual air release. The air release valve lying at the bottom can be used as a drain valve.

According to another preferred embodiment of the invention, the end caps and the rest of the filter housing are made of plastic and are produced by injection molding. In particular, the protective walls, designed as a protective tongue or recess, are inexpensive to produce by injection molding. Filter capsules made entirely of plastic are particularly suitable as disposable filter capsules, and can be supplied in a sterile state in outer packaging.

Further features of the invention will become clear from the following detailed description and from the attached drawings in which preferred embodiments of the invention are illustrated by way of example.

DETAILED DESCRIPTION OF THE PREFERRED EMBODIMENTS

Figure 1:
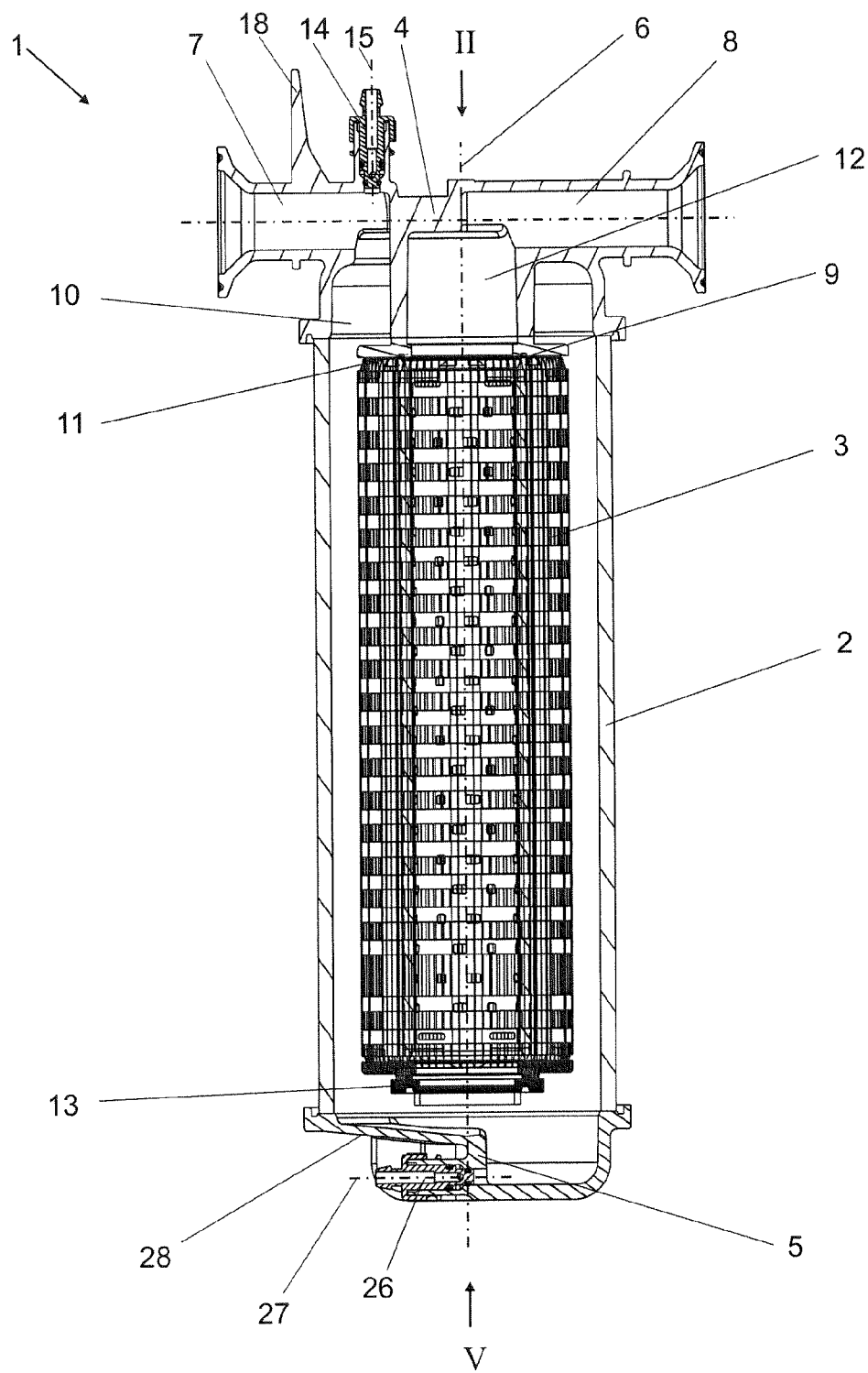
FIG. 1 is a side view, in cross section, of a filter capsule with housing inlet and housing outlet in the T style.

A filter capsule for filtering liquid media is identified generally by the numeral 1 in FIG. 1. The filter capsule 1 is composed principally of a filter housing 2 with a filter 3, a first end cap 4 and a second end cap 5.

The first end cap 4 has a housing inlet 7 and a housing outlet 8 transverse to the longitudinal axis 6 of the filter housing 2.

The filter 3 is secured with its first end 9 on the first end cap 4, in this example by welding. A non-filtrate chamber 10 is arranged between the filter 3 and the filter housing 2 and is connected to the housing inlet 7. The filter 3 has an inner tube 11 with an interior that forms a filtrate chamber 12, which is connected to the housing outlet 8. The filter housing 2 has a second end directed away from the first end cap 4 and the second end cap 5 is at the second end of the filter housing 2. The filter 3 has a closed, free end 13 arranged at a distance from the second end cap 5.

Figure 2:
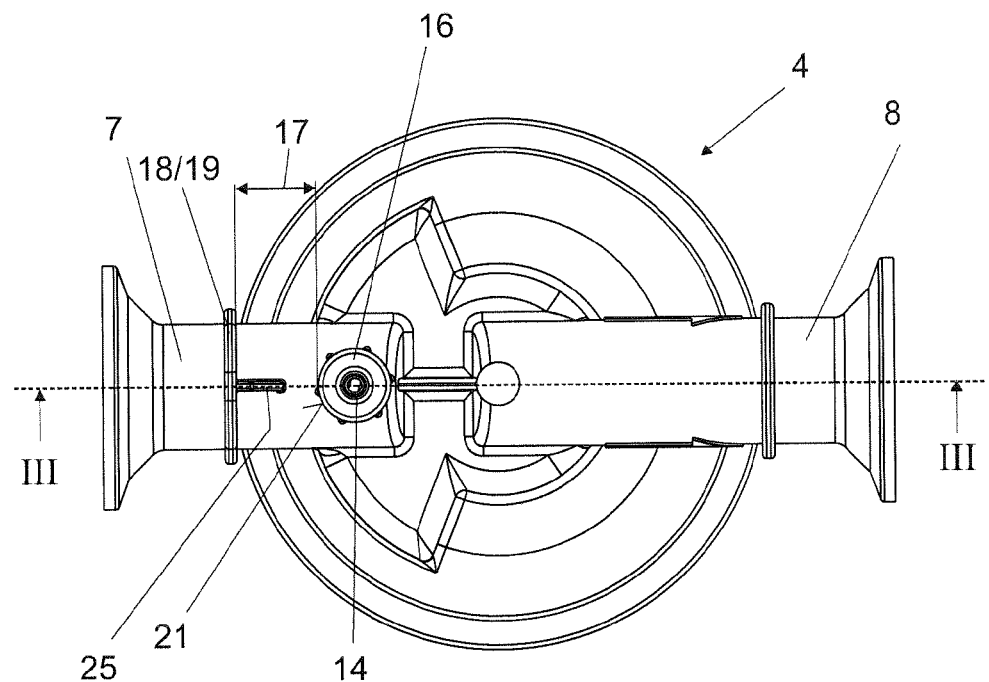
FIG. 2 is a plan view of the filter capsule in FIG. 1 from direction II.
Figure 3:
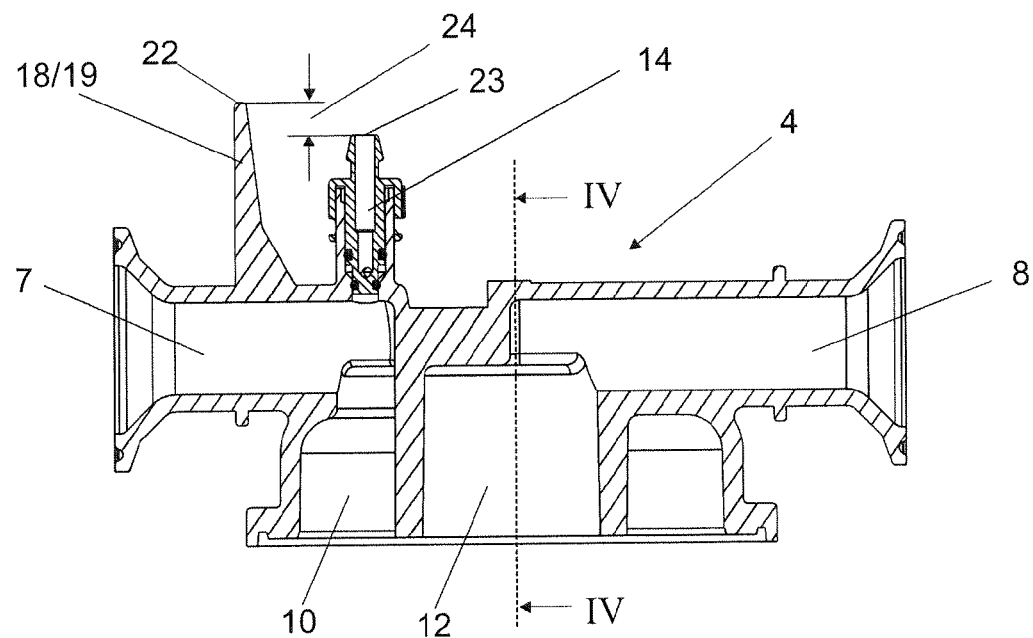
FIG. 3 shows a side view of the first end cap from FIG. 2, in section along line III-III.
Figure 4:
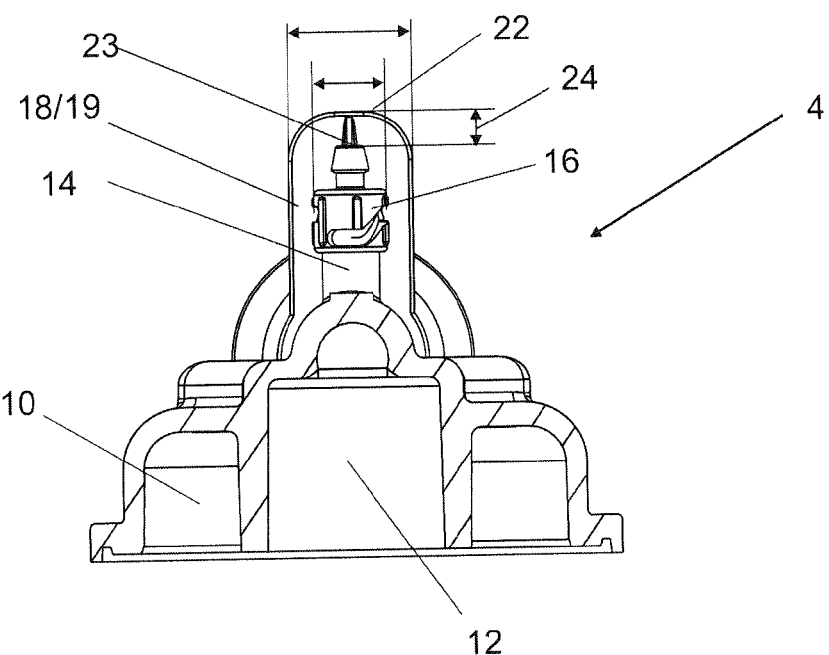
FIG. 4 shows a side view of the first end cap from FIG. 3, in section along line IV-IV.

The first end cap 4 has an air release valve 14 with a longitudinal axis 15 that extends approximately parallel to the longitudinal axis 6 of the filter housing 2. The air release valve 14 is connected to the non-filtrate chamber 10, or connected via the housing inlet 7 to the non-filtrate chamber 10. The air release valve 14 can be opened and closed in a manner known per se by turning a closure part 16 of the air release valve 14, as shown in FIGS. 2 and 4. A protective wall 18 is arranged on the first end cap 4 at a distance 17 from the air release valve 14 and defines a protective tongue 19 directed away from the first end cap 4. The protective tongue 19 is arranged approximately parallel to the longitudinal axis 6 of the filter housing 2 and has a tongue width that is greater than the external diameter 21 of the air release valve 14, as shown in FIG. 2. The free end 22 of the protective tongue 19 protrudes beyond the free end 23 of the air release valve 14 by a distance 24, as shown in FIG. 3. The protective tongue 19 has a stabilizing rib 25 toward the first end cap 4, as shown in FIG. 2.

Figure 5:
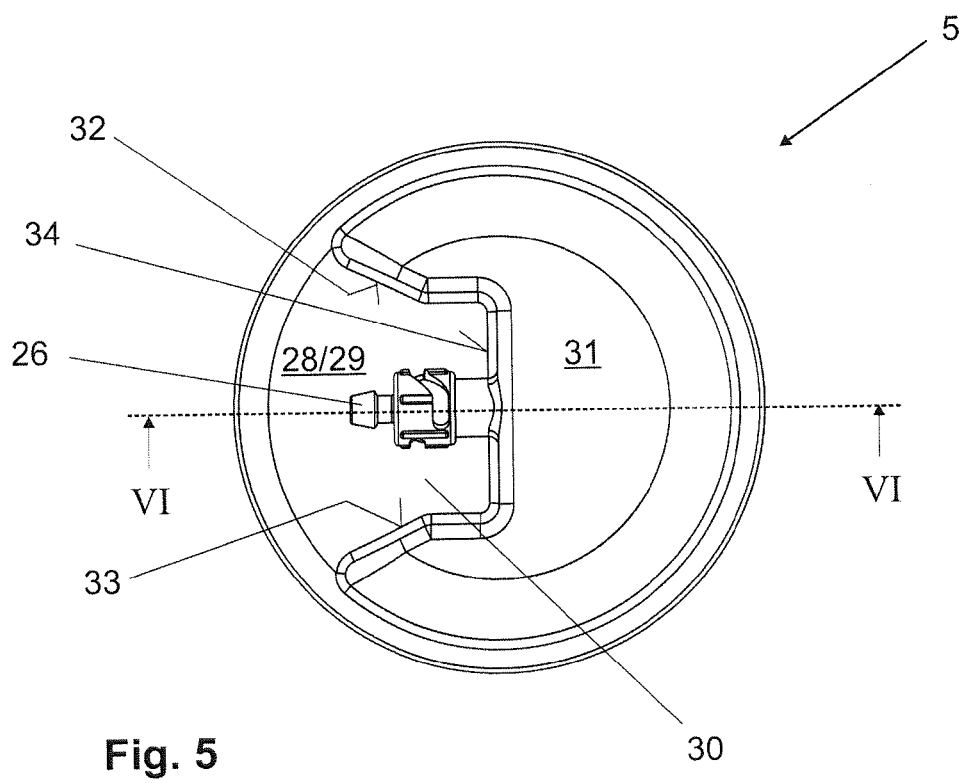
FIG. 5 shows a bottom view of the second end cap in FIG. 1 from direction V.
Figure 6:
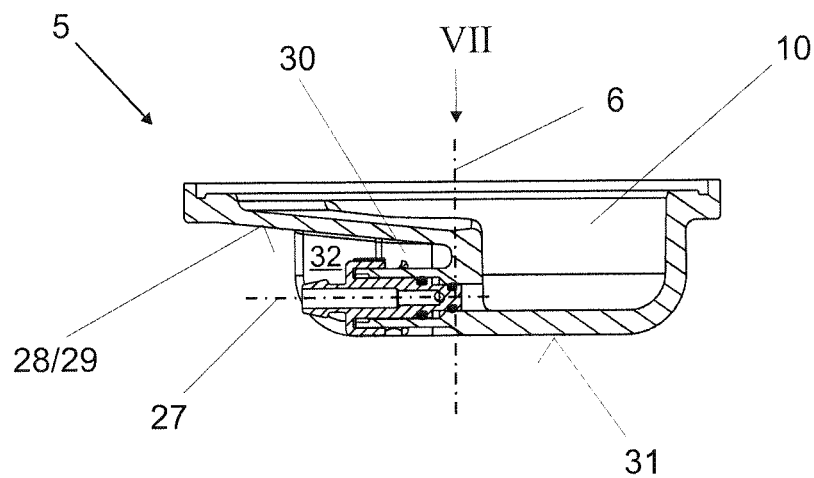
FIG. 6 shows a side view of the second end cap from FIG. 5 along the line VI-VI.
Figure 7:
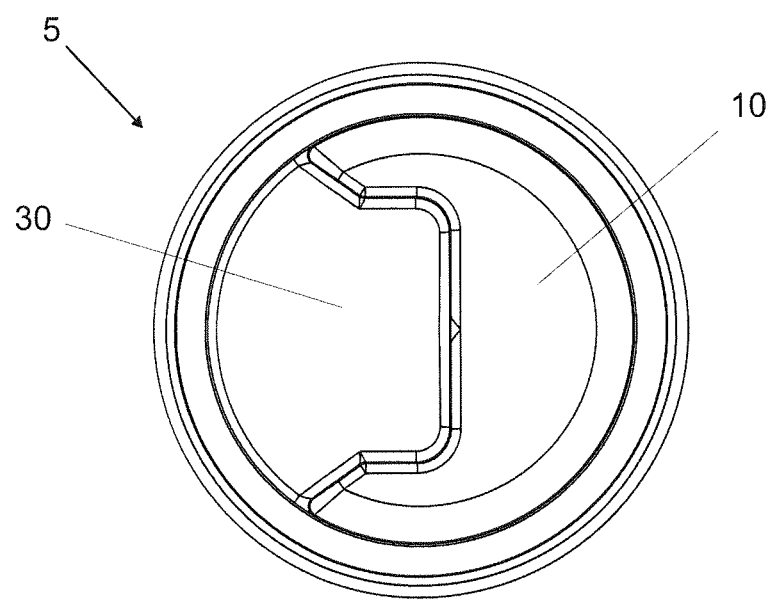
FIG. 7 shows a plan view of the second end cap in FIG. 6 from direction VII.

The second end cap 5 is arranged at the lower end of the filter housing 2 in the vertical direction and has an air release valve 26 with a longitudinal axis 27 arranged transverse to the longitudinal axis 6 of the filter housing 2. A protective wall 28 is arranged on the second end cap 5 at a distance from the air release valve 26 and also is transverse to the longitudinal axis 6 of the filter housing 2. The protective wall 28 forms the bottom 29 of a radially arranged recess 30 of the end face 31 of the second end cap 5, as shown in FIGS. 5 through 7. The recess 30 is open toward the outer circumference of the end cap 5 and is delimited by two mutually opposite side walls 32, 33 and by a base wall 34 that connects the side walls 32, 33, as shown in FIG. 5. The base wall 34 carries the air release valve 26, which is connected to the non-filtrate chamber 10. The side walls 32, 33 and the base wall 34 are arranged approximately perpendicular to the protective wall 28 or to the bottom 29.

The filter housing 2, the end caps 4, 5 with the air release valves 14, 26, and the filter 3 are made of plastic. In particular, the end caps 4, 5 are produced by injection molding. The first end 9 of the filter 3 is welded to the first end cap 4. The end caps 4, 5 in turn are welded to the filter housing 2.

A medium that is to be filtered is fed via the housing inlet 7 to the non-filtrate chamber 10, is filtered by the filter 3, and is removed via the filtrate chamber 12 and the housing outlet 8. If the first end cap 4 with the housing inlet 7 and the housing outlet 8 is arranged at the top in the vertical direction, air is removed if necessary from the non-filtrate chamber 10 via the air release valve 14.

If the first end cap 4 with the housing inlet 7 and the housing outlet 8 is arranged at the bottom in the vertical direction, air is removed from the non-filtrate chamber 10 via the air release valve 26 of the second end cap 5.

The filter capsule 1 is supplied in a sterile state in outer packaging (not shown).

What is claimed is:

1. A filter capsule (1) comprising: a filter housing (2) having opposite top and bottom end caps (4, 5) spaced apart along a longitudinal axis of the filter housing, an air release valve (26) projecting from the bottom end cap (4, 5) and having a longitudinal axis (27) that is approximately transverse to the longitudinal axis (6) of the filter housing (2), at least one protective wall (28, 32, 33, 34) formed on the bottom end cap (4, 5) at a distance from the air release valve (26), and protruding by a distance measured parallel to the longitudinal axis (6) of the filter housing (2) that exceeds a projecting distance of the air release valve (26) measured parallel to the longitudinal axis (6) of the filter housing (2), and a further protective wall (28) extends transverse to the longitudinal axis (6) of the filter housing (2), the further protective wall (28) forming a bottom (29) of a radially arranged recess (30) of the end face (31) of the bottom end cap (5).

2. The filter capsule of claim 1, wherein the recess (30) is open toward a circumference of the end cap (5) and the at least one protective wall includes two mutually opposite side walls (32, 33) and a base wall (34) that connects the side walls (32, 33) and carries the air release valve (26).

3. The filter capsule of claim 2, wherein the side walls (32, 33) and the base wall (34) are arranged perpendicular to the further protective wall (28).

4. The filter capsule of claim 1, wherein the end caps (4, 5) are made of plastic and are produced by injection molding.

5. A filter capsule, comprising: a filter housing (2) having opposite top and bottom end caps (4, 5) spaced apart along a longitudinal axis of the filter housing, an air release valve (14) projecting from the top end caps (4, 5), a housing inlet (7) and a housing outlet (8) arranged transverse to the longitudinal axis (6) of the housing (2) on the top end cap (4), the housing inlet (7) being connected to a non-filtrate chamber (10) arranged upstream of a filter (3) in the filter housing (2), and the housing outlet (8) being connected to a filtrate chamber (12) arranged downstream of the filter (3) in the filter housing (2), at least one protective wall (18) formed on the top end cap (4) at a distance from the air release valve (14) and protruding by a distance measured parallel to the longitudinal axis (6) of the filter housing (2) that exceeds a projecting distance of the air release valve (14) measured parallel to the longitudinal axis (6) of the filter housing (2), the protective wall (18) and the air release valve (14) projecting from the housing inlet (7).

6. The filter capsule of claim 5, wherein a longitudinal axis (15) of the air release valve (14) and the protective wall (18) are arranged approximately parallel to the longitudinal axis (6) of the filter housing (2).

7. The filter capsule of claim 6, wherein the protective wall (18) is a protective tongue (19) directed away from the top end cap (4), the protective tongue (19) having a tongue width that is greater than an external diameter (21) of the air release valve (14), and the protective tongue (19) having a free (22) end that protrudes beyond a free end (23) of the air release valve (14).

8. The filter capsule of claim 7, wherein the protective tongue (19) has a stabilizing rib (25) toward the end cap (4).

9. A filter capsule (1) comprising:
  a filter housing (2) having first and second opposite longitudinal ends and a longitudinal axis (6) extending between the ends;
  first and second end caps (4, 5) mounted respectively to the first and second longitudinal ends of the filter housing (2);
  at least one air release valve (26) mounted on said second end cap (5) and having a longitudinal axis (27) extending in a projecting direction substantially perpendicular to the longitudinal axis (6) of the filter housing (2); and
  at least one protective wall (28) formed on the second end cap (5) at a distance from the air release valve (26), the protective wall (28) protruding beyond the air release valve (26) in at least the projecting direction, and at least part of the protective wall (28) being substantially transverse to the longitudinal axis (6) of the filter housing (2), two mutually opposed side walls (32, 33) projecting on the protective wall (28) on opposite respective sides of the air release valve (26) and a base wall (34) connecting the side walls (32, 33), and the air release valve (26) projecting from the base wall (34).

10. The filter capsule of claim 9, wherein the at least one air release valve comprises a further air release valve (14, 26) mounted on the first end cap (4) and having a longitudinal axis (15) extending in a projecting direction, the protective wall comprising a further protective wall (18) formed on the first end cap (4) and being approximately parallel to the longitudinal axis (15) of the air release valve (14).

11. The filter housing of claim 10, wherein the further air release valve (14) has a width transverse to the projecting direction, the protective wall (18) having a dimension measured parallel to the width of the air release valve (14) that exceeds the width of the air release valve (14).

12. The filter capsule of claim 9, characterized in that the side walls (32, 33) and the base wall (34) are perpendicular to the protective wall (28).

13. A filter capsule (1) comprising:
  a filter housing (2) having first and second ends spaced apart along a longitudinal axis (6);
  first and second end caps (4, 5) mounted respectively to the first and second ends of the filter housing (2);
  a first air release valve (14) mounted on the first end cap (4) and having an axis (15) substantially parallel to the longitudinal axis (6) of the filter housing (2);
  a second air release valve (26) mounted on the second end cap (5) and having an axis (27) substantially perpendicular to the longitudinal axis (6) of the filter housing (2);
  a first protective wall (18) on the first end cap (4), the first protective wall (18) being substantially parallel to the longitudinal axis (6) of the filter housing (2) and protruding beyond the first air release valve (14) in directions parallel and transverse to the axis (15) of the first air release valve (14); and
  second protective walls (28, 29, 32, 33, 34) on the second end cap (5) and including a bottom wall (29) substantially transverse to the longitudinal axis (6) of the filter housing (2) and protruding beyond the second air release valve (26) in directions parallel and transverse to the axis (27) of the second air release valve (26) and two mutually opposed side walls (32, 33) projecting from the bottom wall (29) on opposite respective sides of the second air release valve (26).

14. The filter capsule of claim 13, further comprising a base wall (34) connecting the side walls (32, 33), the second air release valve (26) projecting from the base wall (34).

15. A filter capsule, comprising: a filter housing (2) having opposite top and bottom end caps (4, 5) spaced apart along a longitudinal axis of the filter housing, an air release valve (14, 26) projecting the top end caps (4, 5), at least one protective wall (18, 28, 32, 33, 34) formed on the top end cap (4) at a distance from the air release valve (14, 26) and protruding by a distance measured parallel to the longitudinal axis (6) of the filter housing (2) that exceeds a projecting distance of the air release valve (14, 26) measured parallel to the longitudinal axis (6) of the filter housing (2), wherein a protruding end (22) of the protective wall (18) is rounded and curved convexly around an axis transverse to the longitudinal axis.

16. The filter capsule of claim 15, wherein the at least one protective wall (18) on the top end cap (4) comprises only one protective wall (18).

* * * * *